June 19, 1945.  P. VOLK  2,378,601
TRACER CONTROL FOR MACHINE TOOLS
Filed May 17, 1940  2 Sheets-Sheet 1

Inventor
PAUL VOLK
By Attorney.

June 19, 1945.  P. VOLK  2,378,601

TRACER CONTROL FOR MACHINE TOOLS

Filed May 17, 1940  2 Sheets-Sheet 2

Inventor
PAUL VOLK

By Allt Holcombe
Attorney.

Patented June 19, 1945

2,378,601

UNITED STATES PATENT OFFICE 2,378,601

TRACER CONTROL FOR MACHINE TOOLS

Paul Volk, Berlin-Charlottenburg, Germany; vested in the Alien Property Custodian Application May 17, 1940, Serial No. 335,780
In Germany May 11, 1939

3 Claims. (Cl. 90—13.5)

This invention relates to an electric tracer control for machine tools.

When controlling the feed motion of the tool or work of a machine tool by means of a tracer the motion between the tool and the work takes place, as a rule, in two coordinate directions, i. e. in the direction of the guide feed and in the direction of the tracing feed. By tracing feed is understood the feed motion which must take place towards or away from the work depending upon the inclination of the curve, since this feed motion causes a tracing to be effected according to the pattern, and by guide feed is understood the feed motion, the direction of which depends upon the direction in which the tracer or the tool moves along the curve. These machine tools operate, as a rule, in the manner that the tracing feed motion takes place perpendicularly to the guide feed motion. From the nature of the surfaces to be machined it results that the guide feed retains, in general, its direction, whereas the tracing feed takes place partly in the direction towards the work and partly in the direction away from the work, in which case when machining the work step by step there are working periods during which the tracing feed or the guide feed is disconnected. The design of the control drive must meet exacting requirements in regard to the considerable frequency of switching operation necessary to attain a sensitive tracing of the work for it is only to be expected that the work corresponds exactly to the pattern if the drive follows the control as accurately as possible. Long control paths on the tracer and long running down paths of the drive lead to inaccuracies. Consequently, the tracer as well as the drive must be designed in a particular manner as to fulfill certain conditions. The present invention refers to the drive.

The usual form of drive is a drive through revolving electro-magnetic couplings, one of which is employed for each motion direction. When considering three coordinate directions, three pairs of electro-magnetic couplings, i. e. six couplings are therefore necessary, since each coordinate must be considered in both directions. Another type of drive is effected with the aid of reversible motors without the need of employing electro-magnetic couplings. Furthermore, it has already been proposed to connect mechanical couplings by the electro-magnetic method. As a matter of fact, all these drives may be utilized in practice on machine tools. It seems, however, desirable to improve these drives both from the constructional and operative point of view in order to either reduce the number of the machine parts or to enhance the accuracy of the parts machined. The present invention consists in solving this problem. It relates to a tracer-controlled machine tool of the known type, for instance, to a copying milling machine, copying lathe, a tracer-controlled slotting machine and the like, in which the tool moves relatively to the work in two coordinate directions, i. e. a tracing feed motion and a guide feed motion. Here it may be pointed out that it is quite indifferent whether the work and the pattern are stationary and the tracer and tool effect feed motions or whether the reverse is the case. The invention consists in the fact that at least in one of the two directions of feed, the feed motion is derived from a dynamo electric sun gearing equivalent.

Figure 1:
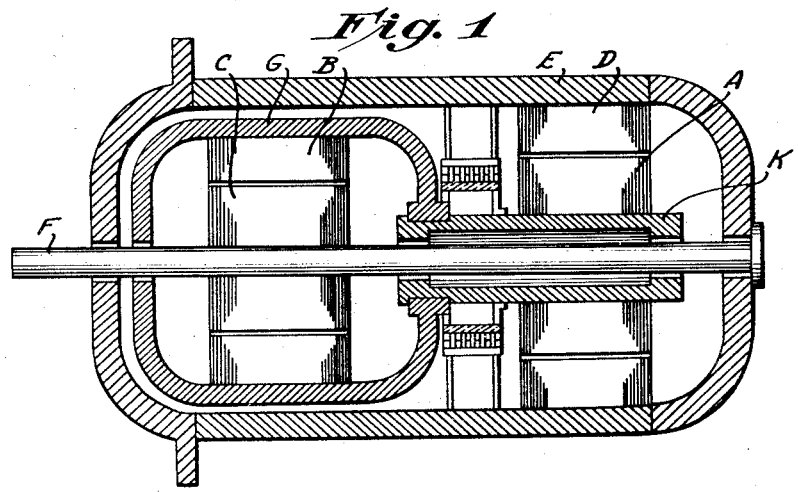
Fig. 1 is a longitudinal section through the sum gearing.

For a better understanding of the invention reference may be had to Fig. 1 in which is shown such a sum gearing. The shaft F is to be driven which is, for instance, connected to the tool support. In a common housing E are arranged two motor part gears consisting of the inducing part D and B respectively and of the induced part A and C respectively. C is directly mounted on the shaft F, whereas B is arranged within a casing G which is connected through the hollow shaft K with A and is rotatably mounted on the shaft F. The part gears of this dynamo electric sum gearing equivalent are designed in the form of three-phase current motors and it is assumed that the two part gears represent six-pole machines. The electrical direction of rotation of the field B is opposite to the mechanical direction of rotation of G. If the sum gearing is switched in the circuit, A runs at a speed of 1000 R. P. M. and therefore G at a speed of 1000 R. P. M. Since as already assumed the direction of rotation of the field of B is opposite to the mechanical direction of rotation, part C therefore rotates with respect to B at a speed of —1000 R. P. M. Viewed with respect to the space the shaft F is at rest. If now the part A—D is changed over from 6 poles to 4 poles it rotates at the speed of 1500 R. P. M. Since from an electrical point of view nothing has been changed in the part drive B—C, the speed of C remains equal to −1000 R. P. M. The sum of the mechanical and electrical speed of the left-hand part gear therefore amounts in this case to +500 R. P. M. If now the part A—D is again changed over to six poles, whereas the part B—C is changed over to four poles, the mechanical speed of G amounts again to 1000 R. P. M. whereas the electrical field speed to −1500 R. P. M. The sum of the electrical and mechanical speed amounts in this case to −500 R. P. M.

The same absolute values of the speed of C may be attained if B is not designed as a pole changing part, whereas the part A—D is so designed as to be capable of being changed over to four poles, six poles and twelve poles. For the sake of clearness these conditions are given in Tables 1 and 2.

*Table 1*

| A | B | C |
|---|---|---|
| 6 P<br>$m+1000$ | 6 P<br>$m+1000$<br>$e-1000$ | 0 |
| 4 P<br>$m+1500$ | 6 P<br>$m+1500$<br>$e-1000$ | +500 |
| 6 P<br>$m+1000$ | 4 P<br>$m+1000$<br>$e-1500$ | −500 |

*Table 2*

| A | B | C |
|---|---|---|
| 6 P<br>$m+1000$ | 6 P<br>$m+1000$<br>$e-1000$ | 0 |
| 4 P<br>$m+1500$ | 6 P<br>$m+1500$<br>$e-1000$ | +500 |
| 12 P<br>$m+500$ | 6 P<br>$m+500$<br>$e-1000$ | −500 |

Thus, as may be seen, Table 1 shows that when A—D is operated as a 6 pole machine, A's motion is +1000 R. P. M. and consequently B's motion is +1000 R. P. M. and when the rotation of the electric field is −1000 the resultant rotation in space of the armature C is 0.

The same arrangement may also be employed for direct current. The conditions are particularly simple if only the part A—D is designed in the form of a direct-current motor, whereas the part B—C is designed as three-phase current motor. For this particular case the conditions are given in Table 3, the uniform or gradual passage from one speed to another being indicated by the arrows.

*Table 3*

| A | B | C |
|---|---|---|
| +1000 | $m+1000$<br>$e-1000$ | 0 |
| +1500 ↓ | $m+1500$<br>$e-1000$ ↓ | +500 |
| +500 ↓ | $m+5000$<br>$e-1000$ ↓ | −500 |

Here, in contradistinction to the tables 1 and 2 no change over is effected to three speeds but to a plurality of speeds whose magnitude depends upon the possibility of controlling the direct-current machine. A uniform passage is attained if the direct-current part is operated according to the Ward-Leonard control.

After having explained the dynamo electric sun gearing equivalent, the essential advantages of this arrangement will presently be explained. As above mentioned, the type of control drive hitherto usual is by means of electro-magnetic couplings; that is the driving sequence is: driving motor—controlled electro-magnetic couplings—tool support. The invention from a constructional point of view presents a great advantage over this arrangement, insofar as the intermediate member between the drive and tool support is omitted. The mechanic-electric sum gearing is itself the motor drive so that special couplings are not necessary. Also from an operative point of view the novel arrangement presents an advantage over the electro-magnetic coupling, insofar as it is not dependent upon the state of the coupling surfaces which are subjected to wear and tear.

The present invention presents a great advantage over the arrangement operating with reversible motors in that the mass forces are reduced. If reversible motors are employed the motor must first be braked from its operating speed till it stops and then accelerated again to the operating speed in the opposite working direction, if the movement of the tool towards the work is to be changed into a movement away from the work. In this case the trouble caused by the undue heating of the motor is not so serious as the relatively long time which is necessary in reversing the direction of rotation of the motor. This time determines the running down path so that difficulties will be expected, if the object to be machined is to be extremely accurate. Additional brakes of the mechanical or electrical type must, as a rule, be employed to shorten the reversal. However, such measures entail the use of more devices and at the same time increase the sources of trouble. An essential feature of the invention is the fact that a reversal of the direction of rotation of the shaft F as will be apparent from the above tables may be effected without changing the direction of rotation of the motor part gears, i. e., the part A and the part B maintain their direction of rotation and are not reversed throughout the entire working process, even when the shaft F is at rest. That which occurs during the controlling process is merely an acceleration or retardation within a given range of speed, but not a stoppage of the machine or even a reversal of the direction of movement. Consequently, these mass forces are considerably reduced owing to this characteristic of the gearing.

Figure 2:
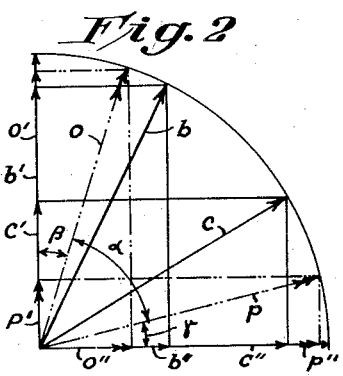
Fig. 2 is a diagram showing the conditions of motion between the tool and work.
Figure 3:
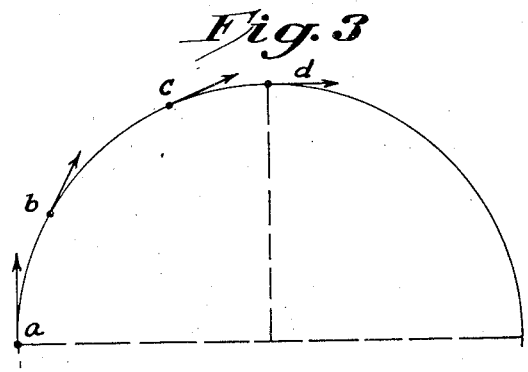
Fig. 3 is a diagram showing the working direction.

Another important advantage of the novel arrangement will be explained by reference to Fig. 2 which schematically shows the conditions of motion. If a curve, for simplicity a circular arc is scanned, the working direction (Fig. 3) varies with the inclination of the curve. The vector of the working direction is indicated by the tangent of the curve. In point $a$ (Fig. 3) the tangent is perpendicular. The angle of the vectors $b$, $c$ decreases with the progressive movement along the curve until the vector $d$ is horizontal. Assuming that the guide feed and the tracing feed are derived from two motors which are operated according to the Ward-Leonard control, the component $b$ (Fig. 2) of motion may evidently be obtained as a resultant of a vertical component $b'$ and a horizontal component $b''$. The component $c$ is obtained by the geometric addition of the two components $c'$ and $c''$. This geometric addition to the corresponding motion vector is limited by the possible range which when using the usual control means amounts approximately to 1:10, i. e., the greatest vector O is the resultant of the greatest vertical component $o'$ and of the smallest horizontal component $o''$ and the greatest vector P is the resultant of the smallest vertical component $p'$ and of the greatest horizontal component $p''$. The greatest working range of such a control is therefore determined by the angle $\alpha$. Inclinations within the angles $\beta$ and $\gamma$ can no longer be easily brought about with the aid of the controls hitherto known, but require particular control means which naturally render the construction considerably complicated. However, as will be seen from Tables 1 to 3, the novel arrangement permits in both coordinate directions the adjustment of the zero speed. Consequently, the guide feed may be disconnected and the full tracing feed connected and vice versa, without disconnecting one of the motors. This implies a considerable increase of the working range of such a control.

The dynamo electric sun gearing equivalent may be constructed in various manners. The construction of the two motor part gears in the form of a self-contained unit shown in Fig. 1 is undoubtedly the most suitable.

However, the two machines may be separately arranged. In this case it depends upon the working conditions of the control as to whether the direct coupling of the parts A and B is to be retained or whether they are coupled through a reduction gear. It is also conceivable to cause the change of the drive of the part B to be effected in a mechanic gear which may be designed in the form of a step gear or of a uniformly controllable gear. The control may also be readily employed if the control movements are not effected by an automatic tracer but as is well known with the aid of a hand control in which the control impulses are transmitted to the sum gear by a lever serving to bring about a resultant movement or by means of various levers for the motion components.

Figure 4:
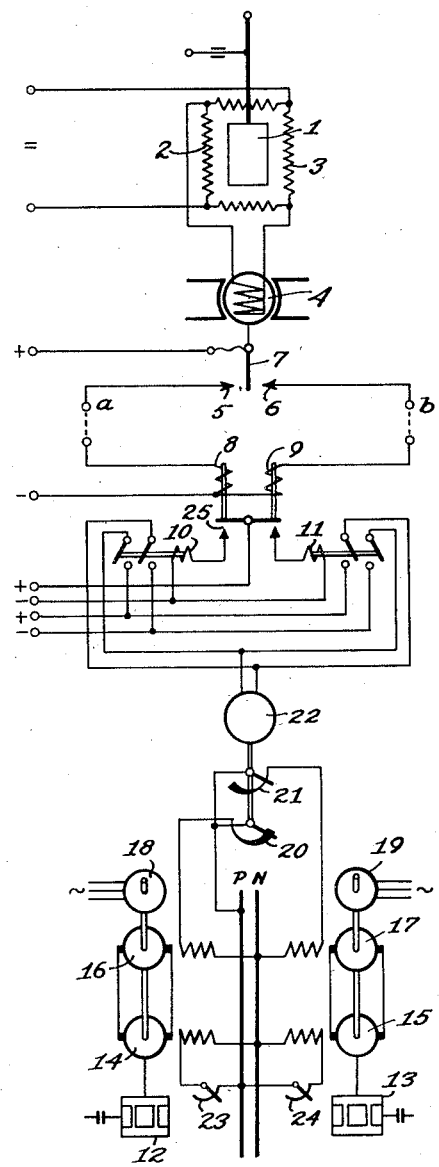
Fig. 4 is a diagram of the circuit controlled by the tracer.
Figure 5:
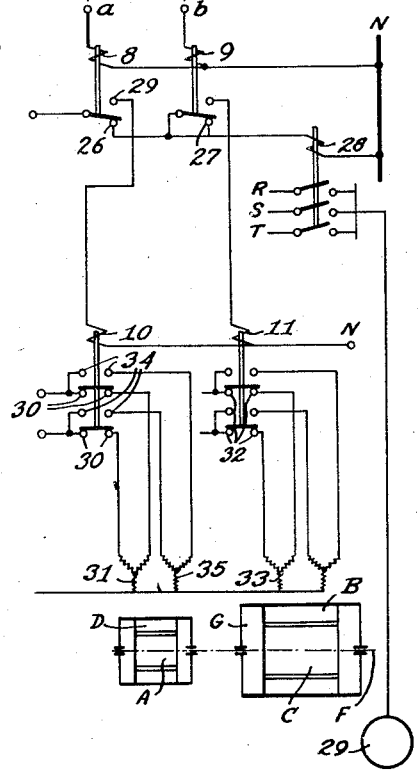
Fig. 5 is a diagram of a modified circuit controlled by the tracer.

In Figs. 4 and 5 are illustrated some possibilities of control which will hereafter be briefly dealt with.

Figure 4A:
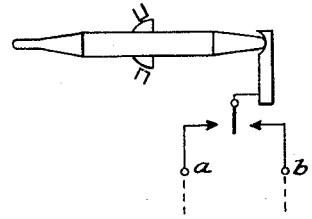
Fig. 4a illustrates a tracer.

Fig. 4 shows a connection in which the mechanic-electric sum gearing operates partly with three-phase current and partly with direct current. In this case the tracer is of the bolometric type. However, the design of the tracer does not form an essential feature of the invention. As shown in Fig. 4a a normal contact tracer or any other tracer may be employed in the same manner. 1 is the bolometer vane, 2 and 3 are bolometer resistances which as is well known are inserted in a bridge and which control the bolometric relay 4 which serves to actuate the contacts 5 and 6. If the bolometer vane 1 is in the central position the bolometer relay 4 is deenergized and the movable contact 7 is midway between the contacts 5 and 6. 8 and 9 are auxiliary relays; 10 and 11 the control relays proper. 12 is a schematical representation of the sum gearing for the guide feed and 13 the sum gearing for the tracing feed. The inducing part of the two gearings is energized by three-phase current. 14 and 15 are the gear parts corresponding to the motor part gears A—D of Fig. 1 and which are operated with the driving motors 18 and 19 and the motors are fed by the generators 16 and 17 in Ward-Leonard connection. The energization of the two generators is regulated through the resistances 20 and 21 which are adjusted by the motor 22. The speed of the motors 14 and 15 may be adjusted by the regulators 23 and 24.

If the machine is energized and the tracer does not contact the pattern the movable contact 7 of the bolometric relay is in the central position. The auxiliary relays 8 and 9 are not energized, the control relays 10 and 11 are released and the energization of the generators 16 and 17 is adjusted in accordance with the adjustment of the rheostats 21 and 20, i. e., as a rule, in such a manner that the guide feed motion=0, whereas the tracing feed motion has attained its maximum speed value. If the tracer now contacts the pattern, the bolometer vane 1 is deflected in such a manner that the contacts 5 and 7 are closed by the energization of the bolometric relay 4. The auxiliary relay 8 is thus energized and closes the contact 25, thereby energizing the relay 10, thus connecting the left-hand terminal of the motor to + and the right-hand terminal to —. The motor 22 is put into operation and adjusts the rheostats 20 and 21 in the manner that the tracing feed motion is retarded and the guide feed motion is switched in the circuit and accelerated. If the pressure is still exerted on the tracer, the motor 22 remains energized and adjusts the rheostats 20 and 21 to a further extent until the resultant movement of the component movements of the two sum gearings corresponds to the inclination of the curves to be scanned. If the machining is continued beyond a maximum of the curve, the bolometer vane 1 is deflected to the other side, i. e. the contacts 6 and 7 are closed, thus energizing the relay 9, thereby actuating the control relay 11 to cause the motor 22 to rotate in the opposite direction, i. e., the rheostats 20 and 21 are adjusted in the opposite direction, thereby rotating the motion vector (Fig. 2). The working process is therefore effected in a uniform manner.

In the connection shown in Fig. 5 the known intermittent control is employed. The bolometric arrangement itself is not shown. The points $a$ and $b$ of Fig. 5 correspond to the points $a$ and $b$ of Fig. 4. In the central position of the bolometer the auxiliary relays 8 and 9 are deenergized, i. e. the resting contacts 26 and 27 are closed, thus energizing the relay 28 for the tracing feed and inserting the motor 29 in the circuit so as to cause the tracer to approach the work. If the tracer contacts the pattern, the bolometric relay is actuated thus energizing, for instance, the auxiliary relay 8 whose make contact 29 is thereby closed. As long as the relay 8 was released, the six-pole windings 31 and 33 of both electrical part gears A—D and B—C were inserted in the circuit through the contacts 30 and 32 so that the speed of the shaft F is zero as will be apparent from Table 1. Upon the energization of the relay 10 its contacts 34 are closed and the contacts 30 are opened so that the six-pole winding in the gear A—D is changed over to the four-pole winding 35, i. e., as results from Table 1, the speed of the shaft F for the guide feed amounts to 500 R. P. M., while at the same time upon the disengagement of the contact 26 the relay 28 is caused to be released and the motor 29 for the tracing feed is disconnected. Consequently, the tool carries out a slight transverse movement which continues till the tracer comes out of engagement with the pattern. The auxiliary relay 8 is then released again, the gear A—D is again changed over to the six-pole winding, the relay 28 is energized and therefore the working movement is again changed over from the guide feed to the tracing feed. As soon as the maximum of the curve is exceeded the auxiliary relay 9 is actuated, i. e., the speed of the shaft F varies now from 0 to −500 R. P. M. The above-indicated speeds are only illustrative and quite other values may be chosen in practice.

What is claimed is:

1. In a machine tool of the character wherein a tracer feed is provided which moves the tool in accordance with the profile to be produced and a guide feed is provided which moves the tool in accordance with the feed motion desired, a bolometer adapted to exert a control effect, selective relay means having a neutral position and two positions on the opposite sides of the neutral position wherein opposite effects are exerted to change simultaneously and in an inverse direction the effective values of two resistance units, and a pair of motor units connected respectively to receive power the value of which changes with the value of said effective resistance, each of said motor units comprising, a rotor, a stator for electromagnetically driving said rotor, and a motor for rotating said stator in a direction opposite to the direction of rotation of said motor, whereby the speed and direction of rotation of said rotor is the algebraic sum of the relative rotary movement between said rotor and said stator and the rotary movement of said motor.

2. In a machine tool of the character wherein a bolometer is mounted to indicate the desired relative movement between the working piece and the tool and wherein a feed control is provided which is independent of a tracer control with one control being reversible, a motor unit to provide said one control comprising a first motor and a second motor formed respectively by a first stator and a first rotor and a second stator and a second rotor, means mounting said rotors in axial alignment and mounting said second stator to be driven by said first rotor, each of said stators including a field winding assembly formed in a manner whereby the number of magnetic poles may be automatically changed in accordance with the action of the bolometer, said motors being operative in opposite directions whereby the resultant rotation of said second rotor is the algebraic sum of the rotation of said first motor and said second motor, and said bolometer being effective selectively to change the relative speeds of the two motors so that the resultant rotation of said second rotor is changed.

3. Apparatus as described in claim 2 wherein said bolometer has three effective positions comprising a first position, a second position and a third position, said third position being neutral and said first and second positions being connected respectively to energize a first and second relay, said first relay being effective upon energization and de-energization thereof to change the number of poles in said second motor and said second relay being similarly connected to change the number of poles in said first motor, and an independent motor connected to be de-energized when said first relay is effective to reduce the number of poles in said second motor.

PAUL VOLK.